United States Patent [19]

Moyer et al.

[11] Patent Number: 5,752,267

[45] Date of Patent: May 12, 1998

[54] A DATA PROCESSING SYSTEM FOR ACCESSING AN EXTERNAL DEVICE DURING A BURST MODE OF OPERATION AND METHOD THEREFOR

[75] Inventors: William C. Moyer, Dripping Springs; Charles Kirtland; John H. Arends, both of Austin, all of Tex.

[73] Assignee: Motorola Inc., Schaumburg, Ill.

[21] Appl. No.: 534,763

[22] Filed: Sep. 27, 1995

[51] Int. Cl.$^6$ ............................................. G06F 13/00
[52] U.S. Cl. ............................... 711/167; 364/DIG. 1
[58] Field of Search .................................. 395/472, 481, 395/494, 821, 823, 824, 825, 878, 879, 880, 882, 883, 145, 151, 167

[56] References Cited

U.S. PATENT DOCUMENTS

| | | | |
|---|---|---|---|
| 5,193,193 | 3/1993 | Iyer | 395/725 |
| 5,229,971 | 7/1993 | Kiryu et al. | 365/230.03 |
| 5,235,697 | 8/1993 | Steely, Jr. et al. | 395/425 |
| 5,280,587 | 1/1994 | Shimodaira et al. | 395/880 |
| 5,394,538 | 2/1995 | Wada et al. | 395/425 |
| 5,509,138 | 4/1996 | Cash et al. | 395/821 |
| 5,623,638 | 4/1997 | Andrade | 395/494 |

FOREIGN PATENT DOCUMENTS

| | | | |
|---|---|---|---|
| 0358448A2 | 9/1989 | European Pat. Off. | G06F 13/42 |
| 0700002A1 | 8/1995 | European Pat. Off. | G06F 12/14 |

OTHER PUBLICATIONS

European Search Report and Commuication dated Feb. 19, 1997.

*Primary Examiner*—Tod R. Swann
*Assistant Examiner*—David Langjahr
*Attorney, Agent, or Firm*—Craig J. Yudell

[57] ABSTRACT

A data processing system (10) flexibly interfaces with both a variety of memory devices and external peripheral devices. A control register (94) is provided for dynamically controlling a timing relationship for read and write accesses executed by the system. A first set of bits (PA) in the control register provides timing control for an initial amount of time required to read a first data value from an external device. A second set of bits (SA) in the control register provides timing control for each successive amount of time required to read a successive data value from the external device.

32 Claims, 7 Drawing Sheets

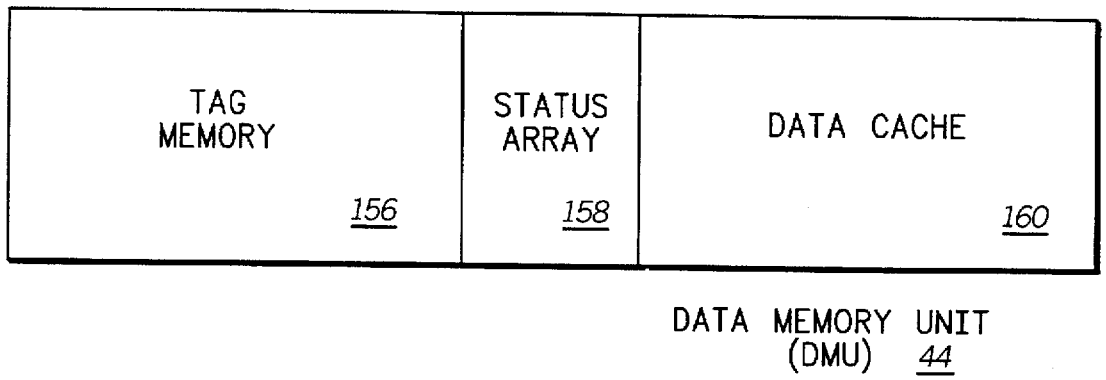
FIG.2
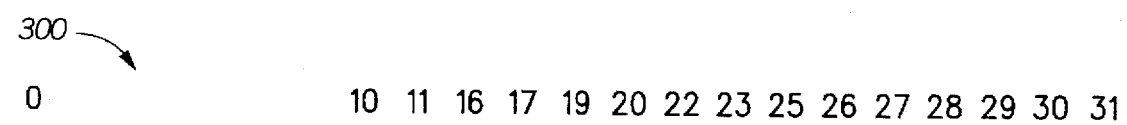
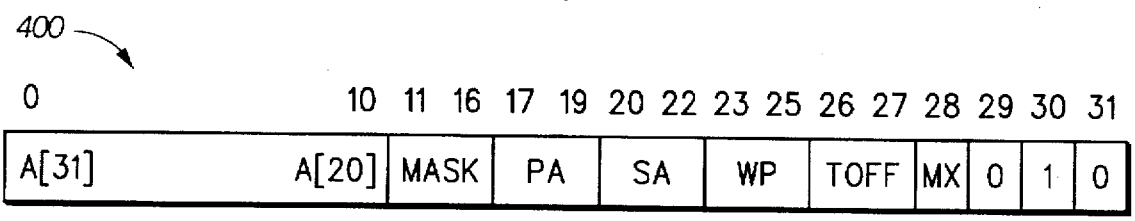
FIG.4

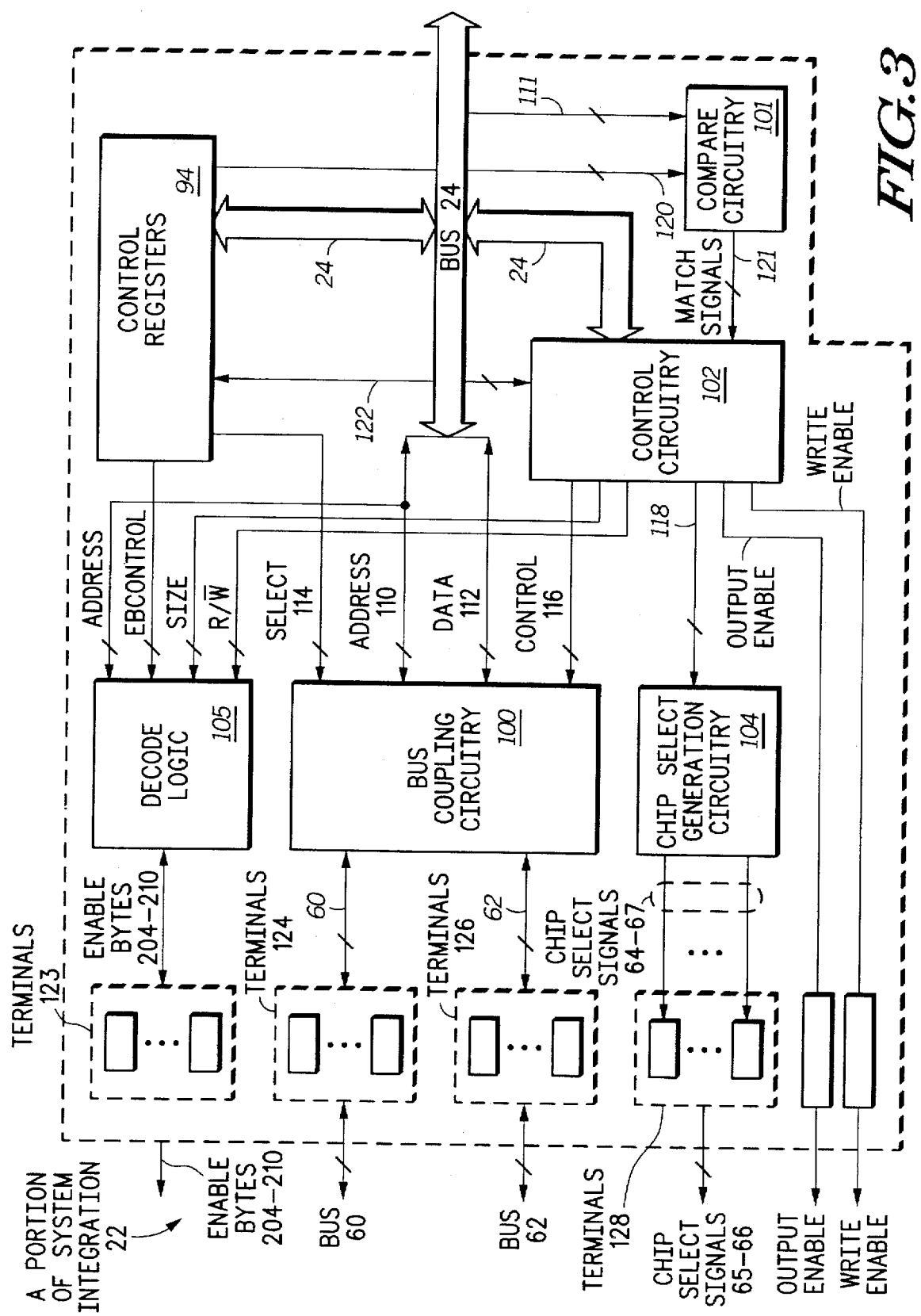

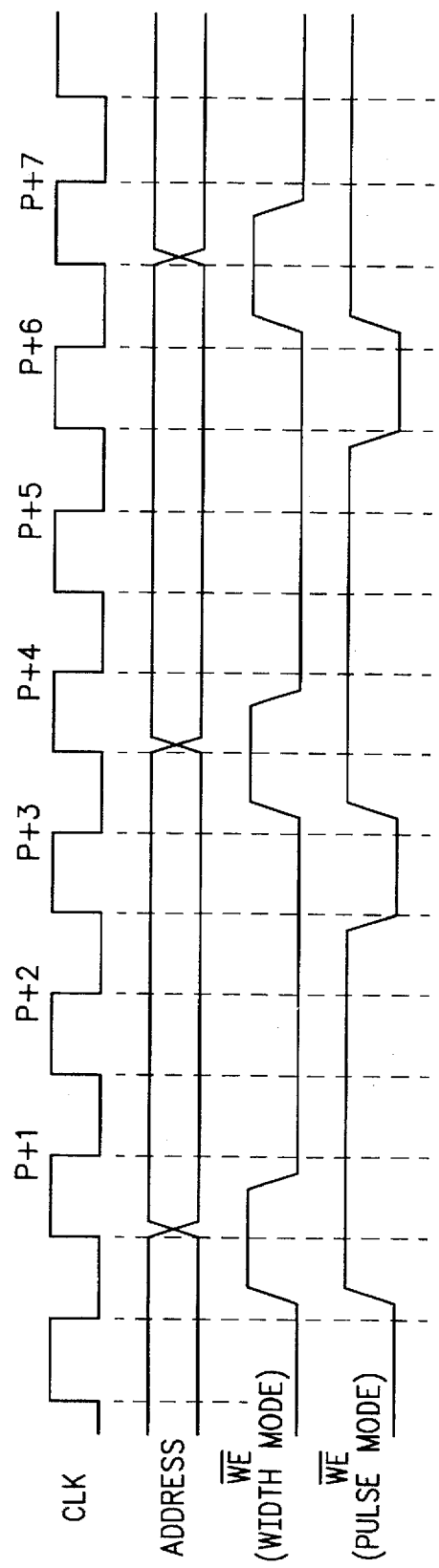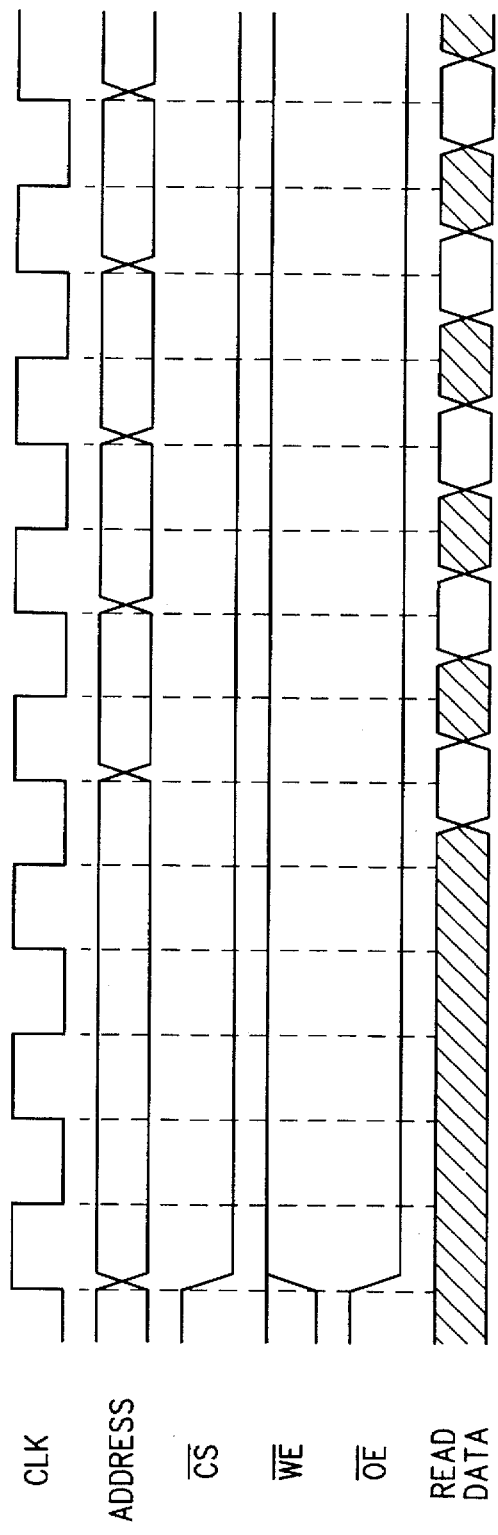

A DATA PROCESSING SYSTEM FOR ACCESSING AN EXTERNAL DEVICE DURING A BURST MODE OF OPERATION AND METHOD THEREFOR

CROSS REFERENCE TO RELATED, COPENDING APPLICATIONS

Related subject matter is contained in the following copending patent applications:

"A Data Processing System For Writing An External Device And Method Therefor" by William C. Moyer et al., application Ser. No. 08/510,510, filed Aug. 2, 1995.

"A Data Processing System For Accessing An External Device And Method Therefor" by William C. Moyer, Ser. No. 08/534,764 and filed Aug. 2, 1995.

FIELD OF THE INVENTION

The present invention relates in general to a data processing system, and more particularly to a method and apparatus for accessing an external device in a data processing system.

BACKGROUND OF THE INVENTION

Integrated circuit microprocessors must, in many cases, be connected with other integrated circuit devices in order to provide certain functions. Examples of such external devices include memories, serial interface adapters, analog-to-digital converters and many others. In most cases, each such external device will require external control signals in order for the device to be appropriately activated when accessed by the microprocessor. For example, a static random access memory (SRAM) integrated circuit requires the chip enable, output enable, and write enable control signals to control read and write accesses. The timing requirements of these signals differ somewhat between commercially available devices. For example, some SRAMs provide output data asynchronously with respect to the output enable signal, whereas other SRAMs sample output enable and provide output data synchronously with a clock signal.

Typically, a designer of a system using a microprocessor and other integrated circuits will use "glue logic" to generate the required chip select signals from the address and bus control signals produced by the microprocessor itself. This extra logic adds significantly to the cost of the system being designed and may degrade performance, and therefore is highly undesirable.

The 80186 (also referred to as the iAPX 186), available from the Intel Corporation of Santa Clara, Calif., is an integrated circuit microprocessor which has internal logic for generating chip select signals. The chip select logic has limited ability to program the address range for which each of the seven possible chip selects is active and can programmably insert wait states into the bus cycles for which each chip select is active. In addition, some of the chip selects may be programmed to be active in only the memory or Input/Output (I/O) address spaces of the microprocessor.

Another example of an integrated circuit microprocessor with on-board chip select logic is that disclosed by John A. Langan and James M. Sibigtroth in U.S. Pat. No. 5,151,986, issued Sep. 29, 1992. The disclosed chip select logic includes a control register by means of which the timing, polarity and number of wait states can be individually programmed for each of several chip select outputs.

A major problem associated with the integration of chip select logic onto a microprocessor integrated circuit involves the provision of sufficient flexibility to the user. The use of glue logic is extremely flexible, since the system designer has wide latitude in the placement of each external device with the microprocessor's memory map and the timing and other characteristics of the chip select signals themselves. This flexibility is very useful, since the variety of possible system designs and chip select requirements for particular peripheral devices is great. Providing sufficient flexibility in an integrated chip select unit while constraining the size and complexity of the unit within reasonable limits is quite difficult.

At the same time, it is important to minimize the cost of the integrated circuit. Several factors contribute to cost of integrating chip select logic. One factor is the amount of circuit area required by the chip select logic, because a larger chip size decreases the number of available die per wafer, etc. Another factor is the number of device pins, because larger pin-count packages are generally more expensive. A third factor is the amount of engineering effort required to design the chip, and a chip which requires less design time is preferable. Thus, there is a need for a flexible yet low-cost chip select logic circuit for integrated circuit microprocessors.

BRIEF DESCRIPTION OF THE DRAWINGS

FIG. 2 illustrates in block diagram form a cache memory unit of the data processing system of FIG. 1;

FIG. 3 illustrates in block diagram form a system integration unit of the data processing system of FIG. 1;

FIG. 4 illustrates in tabular form a plurality of control registers in accordance with one embodiment of the present invention;

FIG. 9 illustrates in timing diagram form an example of a burst write operation executed in accordance with one embodiment of the present invention; and FIG. 10 illustrates in timing diagram form an example of a burst read operation executed in accordance with one embodiment of the present invention.

DESCRIPTION OF THE PREFERRED EMBODIMENTS

Figure 1:
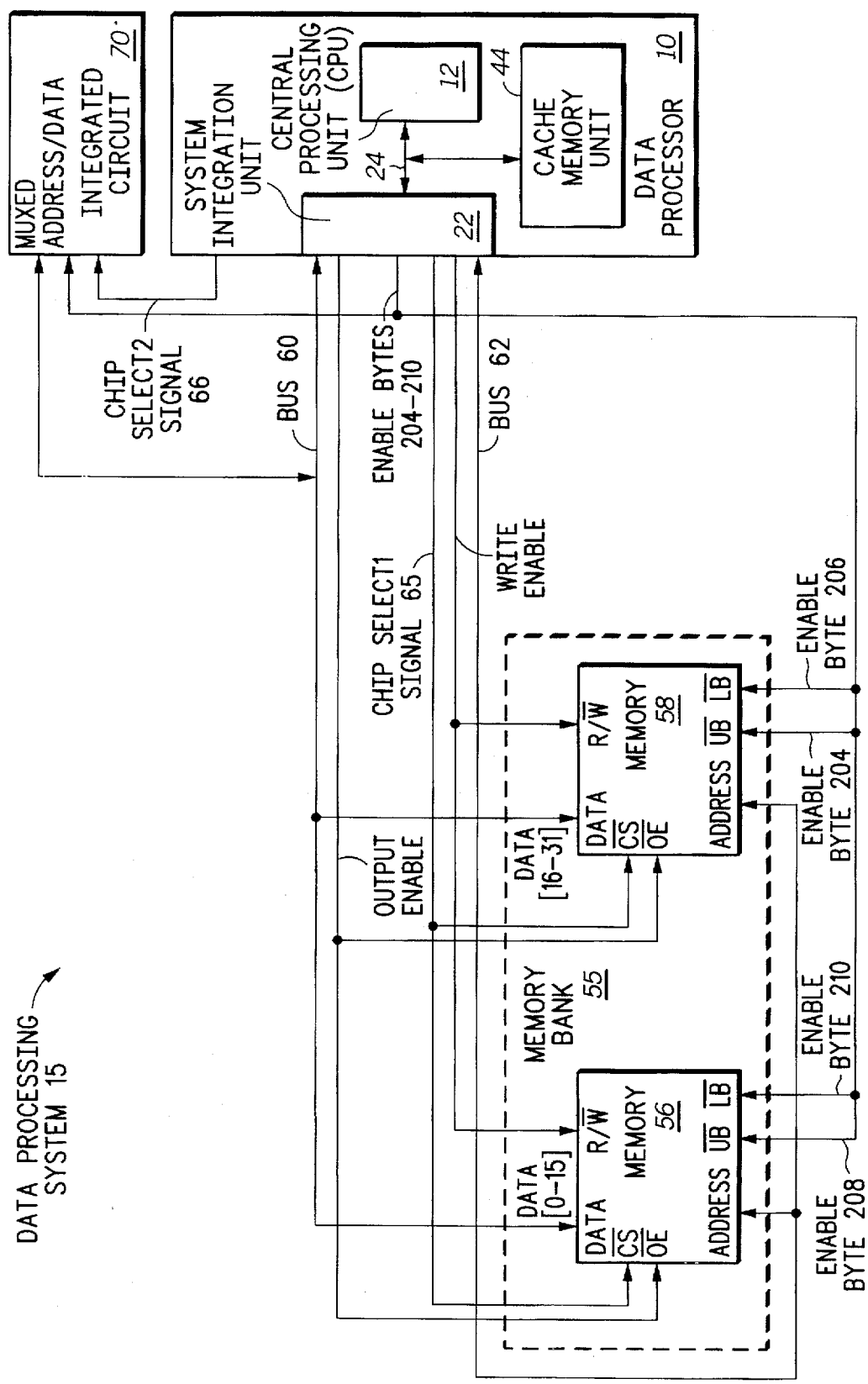
FIG. 1 illustrates in block diagram form a data processing system in accordance with one embodiment of the present invention.

The present invention provides a data processing system and method of operating the data processing system which allows a user great flexibility in selecting both a variety of memory devices and external peripheral devices that will interface with the system. In the data processing system, a control register is provided for dynamically controlling a timing relationship between read and write accesses executed by the data processing system.

For example, a first set of bits stored in the control register determines an amount of time a write enable signal is asserted to indicate a length of time required to write a data value to an external device. The use of the first set of bits in the control register to control assertion of the write enable signal recognizes that the external peripheral devices and external memories included within a data processing system have different timing requirements for read and write accesses. Even the same external peripheral device or memory typically has a write cycle which requires either more or less time to execute than a read cycle. It should be noted that a write operation typically requires more time to execute than a read operation, but for some devices, the write operation may actually take less time than the read operation. By recognizing the difference in the timing requirements for read and write operations among different external peripheral devices and memories, as well as the difference in the timing requirements of read and write operations on the same external device, the first set of bits of the control register allows a user to use the best timing scheme available to increase the efficiency of the data processing system.

Furthermore, the present invention includes this first set of bits in a chip select register which is selectively accessed on a timing cycle by timing cycle basis. As the data processing system accesses an external device, a corresponding chip select register is also accessed to provide proper timing and control information to the external device. Therefore, at each timing cycle, a different chip select register and different timing and control information may be accessed. In the present embodiment of the invention, the ability to select a value controlling a length of a write operation dynamically and in response to a memory location currently being accessed provides a user with greater functional flexibility without increasing a number of external integrated circuit pins required to provide read and write timing control to an external device.

Additionally, the present invention provides a second set of bits in the control register which provides timing control for an initial amount of time required to read a first data value from an external device. The present invention also provides a third set of bits in the control register which provides timing control for each successive amount of time required to read a successive data value from the external device.

The use of the second and third sets of bits in the control register is especially significant when a cache memory is included in the data processing system. When the data processing system accesses a first data value from a preselected memory location, the cache memory is accessed first to determine if the first data value is stored therein. If the data is not stored in the cache memory, the first data value is retrieved from an external device and provided to the cache and a remaining portion of the data processing system. In addition to retrieving the first data value, a plurality of subsequent data values are also retrieved from the external device and stored in the cache memory. The process of retrieving multiple data values in response to a single request for information from the external device is referred to as a burst operation.

In the present invention, the second set of bits in the control register dynamically determines an amount of time required for the data processing system to access the external device during an initial access of a burst operation. Similarly, the third set of bits in the control register dynamically determines an amount of time required for the data processing system to access the external device during a secondary access of the burst operation. By recognizing that the initial access of the burst operation generally requires more time than the secondary access, the initial and secondary access times may be optimized such that the data processing system performs memory reads more efficiently. Furthermore, the ability to select a value controlling a length of a read operation dynamically and in response to a memory location currently being accessed provides a user with greater functional flexibility without increasing a number of external integrated circuit pins required to provide read and write timing control to an external device.

Additionally, the additional functionality of optimizing timing periods corresponding with read and write operations is provided without requiring a software implementation. In the present invention, the length of the timing period of each of the read and write operations is determined during each bus cycle by a corresponding set of bits stored in the aforementioned control register. When a predetermined chip select signal is asserted, each of the corresponding sets of bits is retrieved from an internal memory and stored in the control register. Therefore, no software programming is required to determine the length of the timing period of each of the read and write operations. By providing such flexibility with little required intervention, the present invention provides a low-cost chip select logic circuit for use with all integrated circuit microprocessors.

In a following discussion, the connectivity and operation of one embodiment of a data processing system which implements the present invention will be provided in greater detail.

Connectivity of the Present Invention

In the following description of the connectivity of the present invention, the term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Furthermore, brackets will be used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

Referring now to FIG. 1, FIG. 1 illustrates a data processing system 15 having a data processor 10, a memory bank 55, and an integrated circuit 70. Data processor 10 includes a central processing unit (CPU) 12, a system integration circuit 22, and a cache memory unit 44. Memory bank 55 includes a memory 56 and a memory 58. In one embodiment of the present invention, data processor 10 and each of memories 56 and 58 is implemented as a separate integrated circuit. In alternate embodiments of the present invention, all of data processing system 15 may be implemented on a single integrated circuit.

In FIG. 1, memory 56 of memory bank 55 has a data port which is coupled to conductors [0–15] of bus 60 for receiving data bits [0–15]. Memory 56 also has an address port which is coupled to the conductors of bus 62. In addition, memory 56 has a chip select input (CS) which is coupled to a Chip Select1 conductor 65 for receiving a second chip select signal. Memory 56 also has an output enable input ($\overline{OE}$) which is coupled to the Output Enable signal and a Read/Write (R/$\overline{W}$) input which is coupled to a Write Enable signal. Memory 56 also has an upper byte ($\overline{UB}$) input which is coupled to Enable Byte signal 208 and a lower byte ($\overline{LB}$) input which is coupled to Enable Byte signal 210.

Memory 58 of memory bank 55 has a data port which is coupled to conductors of bus 60 for receiving data bits [16-31]. Memory 58 also has an address port which is coupled to the conductors [0-31] of bus 62. In addition, memory 58 has a chip select input ($\overline{CS}$) which is coupled to Chip Select1 conductor 65 for receiving a second chip select signal. Memory 58 also has an output enable input ($\overline{OE}$) which is coupled to the Output Enable signal and a Read/Write (R/$\overline{W}$) input which is coupled to the Write Enable signal. Memory 58 also has an upper byte ($\overline{UB}$) input which is coupled to Enable Byte signal 204 and a lower byte ($\overline{LB}$) input which is coupled to Enable Byte signal 206.

Data processor 10 is coupled to memory bank 55 by busses 60 and 62 and by chip select conductor 65. Data processor 10 is coupled to integrated circuit 70 by bus 60, Enable Bites 204-210 and by a Chip Select2 conductor 66. A muxed address/data port of integrated circuit 70 communicates both address and data values with bus 60. Integrated circuit 70 is not coupled to and does not receive any address or data values from bus 62.

Note that in some embodiments of the present invention, data processor 10 is formed on a single integrated circuit. In some embodiments data processor 10 is a single chip microcontroller. In alternate embodiments, data processor 10 may be implemented using any type of electrical circuitry. Memories 56 and 58 may be any type of memory. Alternate embodiments of data processing system 15 may include more, fewer, or different peripheral devices (70). In addition, although busses 60 and 62 have been illustrated as 32-bit busses, alternate embodiments of the present invention may use any number of bits in busses 60 and 62.

FIG. 2 illustrates a portion of cache memory unit 44. Cache memory unit 44 comprises a tag memory 156, a status array 158, and a data cache 160. Status array 158 is coupled between tag memory 156 and data cache 160.

FIG. 3 illustrates a portion of system integration circuitry 22 of FIG. 1 in accordance with one embodiment of the present invention. System integration circuitry 22 includes control registers 94, bus coupling circuit 100, compare circuitry 101, control circuitry 102, chip select generation circuitry 104, decode logic 105, terminals 123, terminals 124, terminals 126, and terminals 128. Bus 24 bi-directionally transfers address, data, and control information to each of control registers 94, control circuitry 102, and bus coupling circuitry 100. Address bus 110 is a portion of bus 24 which provides address bits [0-31] to bus coupling circuitry 100. Data bus 112 is a portion of bus 24 which provides data bits [0-31] to bus coupling circuitry 100. Control bus 116 is a portion of bus 24 which provides control information from bus coupling circuitry to control circuitry 102. Note that in some embodiments of the present invention, control circuitry 102 may provide external bus cycle control signals (e.g. address strobe, data strobe, write enable, column address strobe, row address strobe, read/ write, etc.) external to data processor 10 by way of one or more terminals (not shown). Bus 24 is coupled to control registers 94 such that CPU 12 may perform read and write accesses to control registers 94. Bus 24 is coupled to control circuitry 102 in order to provide and receive control information. Bus 24 is coupled to bus coupling circuit 100 by way of address bus 110 and data bus 112 in order to communicate address bits [0-31] and data bits [0-31]. And, bus 24 is coupled to compare circuitry 101 via a signal 111 to provide at least a portion of address bits [0-31].

Registers 94 include a plurality of peripheral control registers (not shown here) and a chip select control register (not shown herein). The chip select control register includes bus loading control bits, address range bits, and other chip select control bits. Bus loading control bits are provided to bus coupling circuit 100 by conductors 114. Compare circuitry 101 is coupled to the chip select control register to receive the address range bits, and possibly one or more of the other chip select control bits. Compare circuitry 101 provides compare results signals to control circuitry 102 via a plurality of conductors 121. Control circuitry 102 provides control signals to bus coupling circuit 100 by a plurality of conductors 116, and control circuitry 102 provides control signals to chip select generation circuitry 104 via a plurality of conductors 118. Control circuitry 102 is bi-directionally coupled to control registers 94 by a plurality of conductors 122. In one embodiment of the present invention, control circuitry 102 receives control bits from the chip select control bits stored in control registers 94 and provides status information back to other chip select control bits. Note that in alternate embodiments of the present invention, the functionality of control circuitry 102 and bus coupling circuit 100 may be combined into one circuit.

Bus coupling circuit 100 is bi-directionally coupled to terminals 124 via a bus 60. Bus coupling circuit 100 is bi-directionally coupled to terminals 126 via a bus 62. Chip select generation circuitry 104 is bi-directionally coupled to terminals 128 via a plurality of chip select conductors 64-67. The plurality of terminals 124 are used to provide bus 60 externally to data processor 10. The plurality of terminals 126 are used to provide bus 62 externally to data processor 10. And, the plurality of terminals 128 are used to provide chip select signals 64-67 externally to data processor 10.

Integrated circuit terminals 124, 126, and 128 may be any type of apparatus which allows electrical signals to be transferred to or from data processor 10. For example, integrated circuit terminals 124, 126, and 128 may be integrated circuit pins, solder bumps, or wire conductors.

Referring now to FIG. 4, FIG. 4 illustrates a portion of the control registers 94 of FIG. 3 in accordance with one embodiment of the present invention. In one embodiment of the present invention, the portion of control registers 94 include a plurality of registers 300 through 400 wherein a predetermined one of the plurality of registers corresponds to a predetermined one of the plurality of chip select signals. For example, a first chip select signal corresponds to control register 300 and a last chip select signal corresponds to control register 400. Each of the plurality of registers includes a plurality of address bits A[31:20] which define a base address of a memory to be accessed during a read or write operation. For example, memory bank 55 may be accessed by a first base address and a second memory circuit (not illustrated herein) may be accessed by a second base address.

Each of the plurality of control registers 300 and 400 also includes a Mask value which stores an address mask value that is able to mask portions of the base address stored in a corresponding plurality of address bits of the base address stored in each of the plurality of control registers 300 and 400. In the embodiment of the invention described herein, the Mask value is used to mask address bits eleven through five.

Each of the plurality of control registers 300 and 400 also includes a Primary Access (PA) value. The PA value includes three control bits which collectively indicate a length of time in which data processor 10 may access a first data value from an external memory. In the embodiment of the invention described herein, the external memory may be one of memory 56 and memory 58 of memory bank 55.

When the PA value has a value of %000, data processor 10 does not provide any timing to the external memory. Rather, data processor 10 allows the external memory to terminate a memory access operation externally. When the PA value has a value of %001, data processor 10 terminates the first access to the external memory after four half clock cycles. When the PA value has a value of %010, data processor 10 terminates the first access to the external memory after five half clock cycles. When the PA value has a value of %011, data processor 10 terminates the first access to the external memory after six half clock cycles. When the PA value has a value of %100, data processor 10 terminates the first access to the external memory after seven half clock cycles. When the PA value has a value of %101, data processor 10 terminates the first access to the external memory after nine half clock cycles. When the PA value has a value of %110, data processor 10 terminates the first access to the external memory after twelve half clock cycles. When the PA value has a value of %111, data processor 10 terminates the first access to the external memory after fifteen half clock cycles.

The relationship of the PA value and a corresponding timing result is provided below in Table 1.

TABLE 1

| PA Value | Timing Function |
|---|---|
| 000 | No timing; Terminated Externally |
| 001 | 4 half clock cycles |
| 010 | 5 half clock cycles |
| 011 | 6 half clock cycles |
| 100 | 7 half clock cycles |
| 101 | 9 half clock cycles |
| 110 | 12 half clock cycles |
| 111 | 15 half clock cycles |

Each of the plurality of control registers 300 and 400 also includes a Secondary Access (SA) value. The SA value includes three control bits which collectively indicate a length of time in which data processor 10 may perform a burst access operation. As was previously described, during the burst access operation, data processor 10 accesses a predetermined number of data values after accessing the first data value from an external memory. Again, the external memory may be one of memory 56 and memory 58 of memory bank 55.

When the SA value has a value of %000, data processor 10 does not support a burst access of the external memory and provides no external timing. When the SA value has a value of %001, data processor 10 terminates a subsequent access to the external memory after one half clock cycle. When the SA value has a value of %010, data processor 10 terminates the subsequent access to the external memory after two half clock cycles. When the SA value has a value of %011, data processor 10 terminates the subsequent access to the external memory after three half clock cycles. When the SA value has a value of %100, data processor 10 terminates the subsequent access to the external memory after four half clock cycles. When the SA value has a value of %101, data processor 10 terminates the subsequent access to the external memory after five half clock cycles. When the SA value has a value of %110, data processor 10 terminates the subsequent access to the external memory after six half clock cycles. When the SA value has a value of %111, data processor 10 terminates the subsequent access to the external memory after seven half clock cycles.

The relationship of the SA value and a corresponding timing result is provided below in Table 2.

TABLE 2

| SA Value | Timing Function |
|---|---|
| 000 | Burst Accesses Not Supported |
| 001 | 1 half clock cycles |
| 010 | 2 half clock cycles |
| 011 | 3 half clock cycles |
| 100 | 4 half clock cycles |
| 101 | 5 half clock cycles |
| 110 | 6 half clock cycles |
| 111 | 7 half clock cycles |

Each of the plurality of registers 300 through 400 also includes a WP (Write Pulse) value. The WP value indicates an amount of time which a Write Enable signal remains active during a memory access operation.

In a first embodiment of the invention, the WP value indicates a length of time the write enable signal is asserted. For example, when the WP value has a value of %000, the write enable signal is asserted for one clock cycle. When the WP value has a value of %001, the write enable signal is asserted for two clock cycles. When the WP value has a value of %010, the write enable signal is asserted for three clock cycles. When the WP value has a value of %011, the write enable signal is asserted for four clock cycles. When the WP value has a value of %100, the write enable signal is asserted for five clock cycles. When the WP value has a value of %101, the write enable signal is asserted for six clock cycles. When the WP value has a value of %110, the write enable signal is asserted for seven clock cycles. When the WP value has a value of %111, the write enable signal is asserted for eight clock cycles.

In a second embodiment of the invention, the WP value may indicate a delay time which must expire before the write enable signal is asserted for a fixed length of operation. In the second embodiment of the invention, when the WP value has a value of %000, the write enable signal is asserted after one clock cycle. When the WP value has a value of %001, the write enable signal is asserted after two clock cycles. When the WP value has a value of %010, the write enable signal is asserted after three clock cycles. When the WP value has a value of %011, the write enable signal is asserted after four clock cycles. When the WP value has a value of %100, the write enable signal is asserted after five clock cycles. When the WP value has a value of %101, the write enable signal is asserted after six clock cycles. When the WP value has a value of %110, the write enable signal is asserted after seven clock cycles. When the WP value has a value of %111, the write enable signal is asserted after eight clock cycles.

The relationship of the WP value and a corresponding timing result is provided below in Table 3.

TABLE 3

| WP Value | Timing Function |
|---|---|
| 000 | 1 clock cycle |
| 001 | 2 clock cycles |
| 010 | 3 clock cycles |
| 011 | 4 clock cycles |
| 100 | 5 clock cycles |
| 101 | 6 clock cycles |

TABLE 3-continued

| WP Value | Timing Function |
|---|---|
| 110 | 7 clock cycles |
| 111 | 8 clock cycles |

In addition to the WP value, each of the control registers 300 and 400 includes a transfer off time (TOFF) value which indicates an amount of time required by data processor 10 to relinquish bus 60 to an external device such as memory bank 55 or integrated circuit 70. When the TOFF value is %00, data processor 10 requires one clock cycle to relinquish bus 60. When the TOFF value is %01, data processor 10 requires two clock cycles to relinquish bus 60. When the TOFF value is %10, data processor 10 requires three clock cycles to relinquish bus 60. When the TOFF value is %11, data processor 10 requires four clock cycles to relinquish bus 60.

Each of the control registers 300 and 400 also includes a MX bit. The MX bit indicates whether the portion of system integration unit 22 should provide information in a multiplexed or non-multiplexed manner.

Note that alternate embodiments of the present invention may use more, fewer, or different register bit fields, and each register bit field may be used for control, status, or both control and status. In addition, alternate embodiments of the present invention may locate bit fields such as the Enable Bytes Control (EBControl) bits in one or more separate registers. Also, different embodiments of the present invention may include any numbers of bits for each of the register bits fields illustrated in FIG. 4. Additionally, in some embodiments of the present invention, the control functionality of one or more of the register bit fields may be combined and encoded into fewer register bit fields.

It should also be noted that a function of the WP bit is not limited to either providing a width of the write enable signal or a length of time a fixed width write enable signal is delayed before being provided to an external device. Indeed, in an alternate embodiment of the invention, the function of the WP bit may be determined by another bit in the plurality of control registers 300 and 400. Therefore, for one type of external memory or device, the WP bit may indicate the width of the write enable signal, while for a second type of external memory of device, the WP bit may indicate the length of time the fixed width write enable signal is delayed before being provided to the external device.

Operation of the Present Invention

Operation of the present invention will now be discussed in greater detail. During operation of data processing system 15 illustrated in FIG. 1, data processor 10 may access data stored in either memory bank 55 or integrated circuit 70. Each of these external devices may require a different interface. For example, in the example illustrated in FIG. 1, each of memories 56 and 58 of memory bank 55 has a data bus bit width of sixteen bits. Additionally, memories 56 and 58 require data processor 10 to specify whether only a lower byte or both an upper and a lower byte should be retrieved from the corresponding memory. Furthermore, integrated circuit 70 requires a multiplexed data bus interface with data processor 10. Even given the significant differences in the interfaces of the memories of memory bank 55 and integrated circuit 70, the present invention implemented in data processor 10 provides each external device with the appropriate control and data values without added logic circuitry or software intervention.

Before describing the present invention in greater detail, a general description of operation of data processing system 15 will be provided. In data processing system 15, each of the external devices is assigned an address range in a memory map of data processor 10. When data processor 10 accesses an address within a first address range which corresponds to memory bank 55, a Chip Select1 signal 65 is asserted to enable memories 56 and 58. Likewise, when data processor 10 accesses an address within a second address range corresponding to integrated circuit 70, a Chip Select2 signal is asserted.

When one of a plurality of Chip Select signals is asserted, other control information must also be provided to correctly interface with a corresponding external device. For example, assume the Chip Select1 signal is asserted to indicate that data processor 10 has accessed an address location associated with memory bank 55. Again, when the Chip Select1 signal is asserted, other control information must also be provided to correctly interface with a corresponding external device. For example, even if the Chip Select1 signal is asserted, an Output Enable signal and a Write Enable signal must also be asserted. Additionally, because memories 56 and 58 each require an Upper Byte (UB) enable input and a Lower Byte (LB) enable input, at least one of the two Enable Byte signals corresponding to either memory must be asserted. In the example illustrated in FIG. 1, memories 56 and 58 provide data having sixteen bits. Because the data has sixteen bits, memories 56 and 58 also require data processor 10 to specify whether one or both of the upper and lower bytes of this data value are to be communicated with data processor 10. Therefore, in this example, the plurality of Byte Enable signals must selectively enable either memory 56 or memory 58 to communicate one or both of the upper and lower bytes of data. Whether the data is read or written is determined by a value of the Write Enable signal provided to a R/W input of each of memories 56 and 58.

In addition to merely indicating that data should be read or written to one or both of memories 56 and 58, the Write Enable signal provides timing information to the external devices when performing such memory accesses. As previously described, much of this timing information is dependent on the external device which is being accessed. For example, some external devices, such as memories 56 and 58 of memory bank 55 may require more or less time to store a data value written by data processor 10. The present invention provides a mechanism for optimizing a length of time which the Write Enable signal should be asserted depending on a type of external device which is being accessed.

Additionally, as was previously explained, in some types of memory access operations, such as a burst access operation, a first memory read access operation will require more time than subsequent read access operations. In response to this type of operation, the present invention optimizes a length of the Output Enable signal depending on a sequential order of a current memory read operation. Each of these operations involving the Output Enable signal and Write Enable signal will subsequently be described in greater detail.

To implement the functionality of the present invention, the plurality of control registers 94 (as illustrated in FIG. 4) control the functionality of the Write Enable signal during external memory access operations. The plurality of control registers 94 and the dynamic controllability of the Write Enable signal will subsequently be discussed in greater detail.

During operation of data processor 10, the plurality of control registers 94 are written with control information prior to execution of a data processing operation which performs a memory access. Furthermore, during operation of data processor 10, CPU 12 is capable of initiating an external bus cycle. An external bus cycle is a bus cycle that is driven external to data processor 10 via busses 60 and 62. CPU 12 initiates an external bus cycle by driving an address value, a corresponding data value, and appropriate control signals on bus 24.

Compare circuitry 101 receives the address value from bus 24 and a plurality of address range bits from bits [0:10] of one of the plurality of control registers 300 and 400 of control registers 94. Compare circuitry 101 then determines an address range associated with the received address value. In one embodiment of the present invention, compare circuitry 101 compares at least a portion of the address value from bus 24 to each set of address range bits provided by the plurality of control registers 94. In the present invention, address bits [31:20] are provided by each of the plurality of control registers 94. However, in alternate embodiments of the present invention, the plurality of address range bits may use any method and any number of bit fields to specify an address range.

Compare circuitry 101 then transfers control signals 121 to control circuitry 102. Control signals 121 indicate which address range and, therefore, which Chip Select signal and which one of the plurality of registers 300 through 400 (of the plurality of control registers 94 illustrated in FIG. 4) will be used to provide control information to control circuitry 102. Control circuitry 102 then provides control signals 118 to chip select generation circuitry 104 to select which of the plurality of Chip Select signals is to be asserted. Control circuitry 102 also sends control signals to the plurality of control registers 94 via conductors 122 to select which of the plurality of registers 300 through 400 will be selected.

For example, if the received address value is in a first address range specified by a first plurality of address range bits, control circuitry 102 will select a first control register of the plurality of control registers 94. When the first control register is selected, the first control register will provide an EBControl signal with a logic value based on a value of a EBControl bit (not illustrated herein) stored therein to decode logic circuit 105. Additionally, the first control register will provide a first WP value, a first PA value, and a first SA value to control circuitry 102. Similarly, if a second received address value is in a second address range specified by a second plurality of address range bits, control circuitry 102 will select a second control register of the plurality of control registers 94. When the second control register is selected, the second control register will provide an EBControl signal with a logic value based on a value of a EBC bit stored therein to decode logic circuit 105. Furthermore, the second control register will provide a second WP value, a second PA value, and a second SA value to control circuitry 102. By dynamically providing the WP values, the PA values, and the SA values in response to a value stored in one of the plurality of control registers 300 and 400 which is associated with a predetermined Chip Select signal, the Write Enable and Output Enable signals may be dynamically modified on each memory access by data processor 10 without any type of external software or hardware intervention. Similarly, by determining a value of the EBControl signal in response to a value stored in a control register associated with a predetermined Chip Select signal, the EBControl signal may also be dynamically modified on each byte access by data processor 10 without any type of software intervention.

As previously mentioned, the plurality of control registers 94 will provide chip select control bits to control circuitry 102 via conductors 122 and will provide a Select signals 114 to bus coupling circuitry 100. Based on the values provided by Select signals 114, bus coupling circuitry 100 will determine with which of bus 60 and bus 62 information should be communicated. Control circuitry 102 may provide timing or other control information to bus coupling circuit 100 via the plurality of conductors 116. Furthermore, when the plurality of control registers 94 provides chip select control bits to control circuitry 102 via conductors 122, control circuitry 102 also generates the Write Enable, Output Enable, and appropriate Chip Select signals in response thereto.

In FIG. 3, it should be noted that the plurality of terminals 124 provide bus 60 externally to data processor 10. The plurality of terminals 126 provide bus 62 externally to data processor 10 and the plurality of terminals 128 provide chip select signals 64 through 67 externally to data processor 10.

To generate the Enable Bytes provided by the plurality of terminals 123, decode logic circuit 105 logically combines a portion of an address value communicated by Address conductors 110, the EBControl signal, the Size signals, and a R/$\overline{W}$ signal. The R/$\overline{W}$ signal indicates if data processor 10 is performing a read or a write operation. Furthermore, in this embodiment of the invention, the address value corresponds to address bits zero (A0) and one (A1) of an accessed address. The EBControl signal is selectively asserted in response to a value of the EBC bit in one of the plurality of control registers 94 (not illustrated herein). Size information is also required by decode logic 105 to determine a size of an access by data processor 10.

As an example, assume a first address accessed by data processor 10 corresponds to a memory stored in memory bank 55. Therefore, the Chip Select1 signal will be asserted. Furthermore, assume that a user of data processing system 15 programmed the plurality of control registers 94 appropriately. Therefore, when control circuitry 102 indicates that memory bank 55 has been accessed, a corresponding one of the plurality of control registers 94 is also accessed. The corresponding one of the plurality of control registers 94 provides the EBControl signal to decode logic 105. Because memory bank 55 includes only memories which have greater than eight bit wide data, decode logic 105 only asserts the Enable Byte signals which correspond to the accessed memory location.

In this first example, a first Enable Byte signal is needed for the UB input and a second Enable Byte signal is needed for the LB input of the memory being accessed. Furthermore, in this first example, decode logic 105 asserts the Enable Byte signals in response to the EBControl signal, the Size signal, and the Address signal. Therefore, when the Size signal indicates that four bytes should be accessed, each of the Enable Byte signals 204 through 210 is asserted to enable data processor 10 to access the upper and lower bytes of data stored in both memory 56 and memory 58.

If only a single byte should be accessed, the Size signal indicates this requirement to decode logic 105. The Address signal is then used to determine whether an upper byte or a lower byte should be accessed. In this example, if data processor 10 writes a value only to the upper byte of an address value stored in memory 56, the Enable Byte 208 signal will be asserted. Additionally, the Chip Select1 signal and the Write Enable signal will be asserted.

Similarly, if two bytes are to be accessed, the Size signal indicates this requirement to decode logic 105. The Address signal is then used to determine whether both an upper byte and a lower byte should be accessed. In this example, if data processor 10 writes a sixteen bit value to an address value stored in memory 56, both the Enable Byte 208 signal and the Enable Byte 210 signal will be asserted. Additionally, the Chip Select1 signal and the Write Enable signal will be asserted.

In each of these situations, control circuitry 102 asserts the Write Enable signal in response to a memory access operation executed by data processor 10 and control values stored in the plurality of control registers 300 and 400. Thus, when data processor 10 writes a data value to a memory location in memory bank 55, the Chip Select1 signal is asserted. A one of the plurality of control registers 300 and 400 which corresponds to the Chip Select1 signal provides the WP value, the PA value, and the SA value stored therein to control circuitry 102. Control circuitry 102 subsequently uses each of the WP, PA, and SA values to dynamically access memory bank 55 in a manner determined by an external user. Note that the WP, PA, and SA values provided to control circuitry 102 are dynamically determined by a Chip Select signal asserted to access an external memory or device. Thus, when the Chip Select1 signal is asserted to access memory bank 55, a first set of WP, PA, and SA values are used to control operation of data processor 10. Similarly, when integrated circuit 70 is accessed by the Chip Select2 signal, a second set of WP, PA, and SA values are used to control operation of data processor 10.

Examples of use of the WP, PA, and SA values in data processing system 15 will subsequently be provided in greater detail.

Memory Access Operation and Write Pulse (WP) Value

When data processor 10 executes a write operation, control circuitry 102 asserts the Write Enable signal in a manner consistent with the programmed WP value.

As previously mentioned, the WP value is programmed by an external user and selectively accessed on a timing cycle by timing cycle basis. As data processor 10 accesses an external device, a corresponding control register is also accessed to provide proper timing and control information to the external device. Therefore, at each timing cycle, a different chip select register and different timing and control information may be accessed. In the present embodiment of the invention, the WP value controls a length of a write operation dynamically and in response to a memory location currently being accessed. This functionality provides a user with greater functional flexibility without increasing a number of external integrated circuit pins required to provide read and write timing control to an external device. Furthermore, the WP value allows the user to optimize timing for the external device such that timing required to perform read and write accesses for the external device are optimized in accordance with the specifications of that device.

Figure 6:
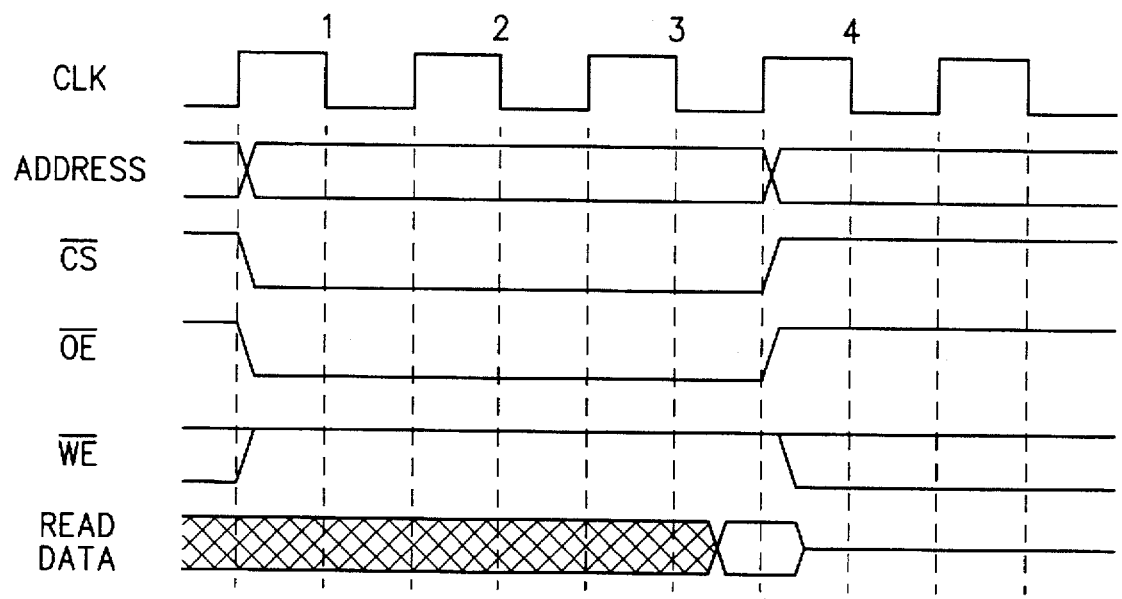
FIG. 6 illustrates in timing diagram form an example of a read operation executed in accordance with one embodiment of the present invention.

FIG. 6 illustrates a timing diagram which indicates an effect of the WP value on the Write Enable ($\overline{WE}$) signal provided to memory bank 55 during a read operation. In FIG. 6, assume that an Address signal is provided to system integration unit 22 via bus 24. The Address signal is used to generate the Chip Select1 signal and the appropriate Enable Byte signals (not illustrated herein). Note that in FIG. 6, the Chip Select1 signal is represented by the $\overline{CS}$ signal. When the Chip Select1 signal is asserted, control circuitry 102 provides the Output Enable signal to memories 56 and 58 of memory bank 55. In FIG. 6, the Output Enable signal is represented by the $\overline{OE}$ signal.

Furthermore, as this is a read operation, and not a write operation, control circuitry 102 negates the Write Enable signal provided to each of memories 56 and 58 of memory bank 55. The Write Enable signal is represented by the $\overline{WE}$ signal in FIG. 6. The data accessed during the read operation (indicated on a Read Data signal) is subsequently provided by one or both of memories 56 and 58 in memory bank 55.

Note that in this example, because a write operation is not executed, the WP value does not effect the timing of the read operation. In this operation, a primary access value stored as the PA value in a corresponding one of the plurality of control registers 300 and 400 determines an amount of time which control circuitry 102 asserts the Output Enable ($\overline{OE}$) signal to one or both of memories 56 and 58 in memory bank 55. In the example illustrated in FIG. 6, the PA value of the one of the plurality of control registers 300 and 400 corresponding to the accessed memory location was a value of %011as six half clock cycles passed between the assertion of the Output Enable ($\overline{OE}$) signal and the receive of valid data from the external device. The PA value will subsequently be discussed in greater detail.

Figure 7:
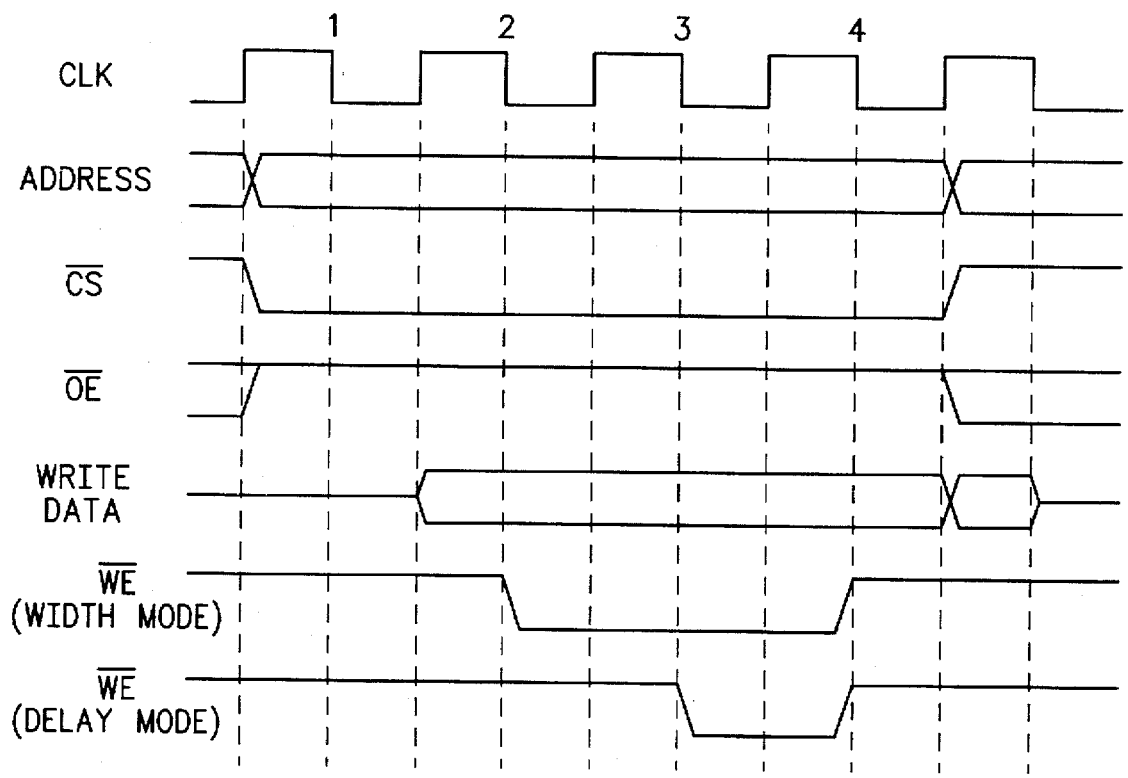
FIG. 7 illustrates in timing diagram form an example of a non-burst write operation executed in accordance with one embodiment of the present invention.

FIG. 7 provides a second timing example in which a WP value does effect the timing of a write operation of data processor 10. In FIG. 7, assume that an Address signal is provided to system integration unit 22 via bus 24. The Address signal is used to generate the Chip Select1 signal and the appropriate Enable Byte signals (not illustrated herein). Note that in FIG. 7, the Chip Select1 signal is represented by the $\overline{CS}$ signal. As this is a write operation, and not a read operation, control circuitry 102 negates the Output Enable signal provided to each of memories 56 and 58 of memory bank 55. The Output Enable signal is represented by the $\overline{OE}$ signal in FIG. 7.

Furthermore, when the Chip Select1 signal is asserted, control circuitry 102 provides the Write Enable signal to memories 56 and 58 of memory bank 55. In FIG. 7, the Write Enable signal is represented by the $\overline{WE}$ signal. The data accessed during the write operation (indicated on a Write Data signal) is subsequently provided to one or both of memories 56 and 58 in memory bank 55.

Note that in this example, two modes of operation of data processor 10 are illustrated. In a first mode of operation, width mode, the WP value indicates a length of time which Write Enable signal is asserted. In this case, the WP value is equal to %01 and, therefore, control circuit 102 asserts the Write Enable signal for two clock cycles (See Table 3). When the Write Enable signal is asserted for two clock cycles to one of memories 56 and 58 of memory bank 55, the device(s) enabled by the appropriate Enable Byte signal retrieve data from bus 60 and address information from bus 62 during the two clock cycles the Write Enable signal is asserted.

During operation, a user of data processing system 15 programs each of the plurality of control registers 300 and 400 in a manner which optimizes an amount of time required to write a data value to an external device. Thus, in the first example illustrated in FIG. 7, the external device requires the Write Enable signal to be asserted at least two clock cycles to store a data value therein.

In the second mode of operation, delay mode, the WP value indicates a length of time which must elapse before the Write Enable signal is asserted for a fixed length of time. In this case, the WP value is equal to %10 and, therefore, control circuit 102 asserts the Write Enable signal after three clock cycles have elapsed (See Table 3). After three clock cycles, the Write Enable signal is asserted for a single clock cycle to one of memories 56 and 58 of memory bank 55, the device(s) enabled by the appropriate Enable Byte signal retrieve data from bus 60 and address information from bus 62 during the single clock cycle the Write Enable signal is asserted.

During operation, a user of data processing system 15 programs each of the plurality of control registers 300 and 400 in a manner which optimizes an amount of time required to write a data value to an external device. Thus, in the second example illustrated in FIG. 7, the external device requires the Write Enable signal to be asserted after three clock cycles to store a data value therein.

In summary, the WP value in each of the plurality of control registers 300 and 400 indicates a write timing requirement of a corresponding external device. The WP value may be programmed to provide an optimized write timing period for an accessed external device on an access by access basis. Furthermore, the PA value may be used to provide an optimized read timing period for the accessed external device on an access by access basis. The PA value will subsequently be described in greater detail. By providing the WP value to program the write timing period independently of the read timing period provided by the PA value, data processor 10 may conform to a most restrictive specification for read and write operations of various external devices independently. Therefore, penalties associated with write operations may be avoided on non-write timing cycles. Stated another way, read operations may be executed as quickly as possible and aren't required to consume a same amount of time as write operations. As write operations may be either longer or shorter than read operations, timing cycles may be optimized for either operation as well as for a type of external device being accessed.

Memory Accesses Using PA and SA Values

Each of the plurality of control registers 300 and 400 includes a PA (primary access) value which provides timing control for an initial amount of time required to read a first data value from an external device. Each of the plurality of control registers 300 and 400 includes a SA (secondary access) value which provides timing control for each successive amount of time required to read a successive data value from the external device.

The use of the PA and SA values in each of the plurality of control registers 300 and 400 is especially significant when a cache memory, such as data cache 44, is included in data processing system 15. For example, when data processor 10 accesses a first data value from a preselected memory location, tag memory 156 is used to determine if the first data value is stored in data cache 160. If tag memory 156 indicates that the first data value is stored in data cache 160 and a corresponding location in status array 158 indicates the first data value stored in data cache 160 is valid, the first data value is accessed from data cache 160 and provided to CPU 12 via bus 24. The use of data caches, tag memories, and status arrays is well known in the data processing art and will not subsequently be described in greater detail.

However, if tag memory 156 indicates that the first data value is not stored in data cache 160, CPU 12 provides an address corresponding to the first data value to the portion of system integration unit 22. System integration unit 22 utilizes the address to generate a chip select signal which indicates an external device from which the first data value may be accessed. When the chip select signal is asserted to select the external device, a corresponding one of the plurality of control registers 300 and 400 provides a plurality of control values including the PA, SA, and WP values. Subsequently, when the external device is accessed, the first data value is retrieved and stored in data cache 160 of data processor 10. Additionally, if data processor 10 is operating in a burst mode of operation, a preselected number of additional data values will also be retrieved and stored in data cache 160 for use during future data processing operations. Each of the subsequent data values retrieved required less time to access than the first data value.

The PA and SA values implemented by the present invention allow an external user to optimize the timing of both a primary access of the first data value and a plurality of secondary accesses of a plurality of subsequent data values. The PA value dynamically determines an amount of time required for data processor 10 to access the external device during the primary access of the first data value during a burst operation. Similarly, the SA value dynamically determines an amount of time required for the data processor 10 to access the external device during each of the secondary accesses of the burst operation.

When the PA and SA values are retrieved from one of the plurality of control registers 300 and 400 during a memory access operation, the PA and SA values are provided to control circuitry 102. Control circuitry 102 decodes the PA and SA values to provide the Output Enable signal for a preselected period of time. The Output Enable signal will be asserted for a first period of time indicated by the PA value to read a first data value from an external device. As well, the Output Enable signal will be asserted for a second period of time indicated by the SA value to read a preselected number of data values from the external device. Note that the PA value and the SA value are dynamically determined in response to an asserted Chip Select signal. Therefore, when a chip select signal is asserted, the PA and SA values stored in a corresponding one of the plurality of control registers 300 and 400 are provided to control circuitry 102.

FIG. 10 illustrates a first example in which a burst read operation is executed in response to PA and SA values corresponding to a chip select signal asserted to access an external device. In FIG. 10, assume that an Address signal is provided to system integration unit 22 via bus 24. The Address signal is used to generate the Chip Select1 signal and the appropriate Enable Byte signals (not illustrated herein). Note that in FIG. 10, the Chip Select1 signal is represented by the $\overline{CS}$ signal. When the Chip Select1 signal is asserted, control circuitry 102 provides the Output Enable signal to memories 56 and 58 of memory bank 55. In FIG. 10, the Output Enable signal is represented by the $\overline{OE}$ signal.

In FIG. 10, the PA value is equal to %011 such that six half clock cycles must elapse before data processor 10 may access valid data from memories 56 and 58 of memory bank 55. Additionally, the SA value is equal to %001 such that only one half clock cycle must elapse before data processor 10 may access data values provided by memories 56 and 58 of memory bank 55. Furthermore, as this is a read operation, and not a write operation, control circuitry 102 negates the Write Enable signal provided to each of memories 56 and 58 of memory bank 55. The Write Enable signal is represented by the $\overline{WE}$ signal in FIG. 10. Note that in this example, because a write operation is not executed, the WP value does not effect the timing of the read operation.

By allowing a user to program each of the plurality of control registers 300 and 400 to reflect optimal timing for primary and secondary accesses of an external memory during a burst mode of operation, the PA and SA values of the present invention efficiently perform burst memory read operations.

Figure 5:
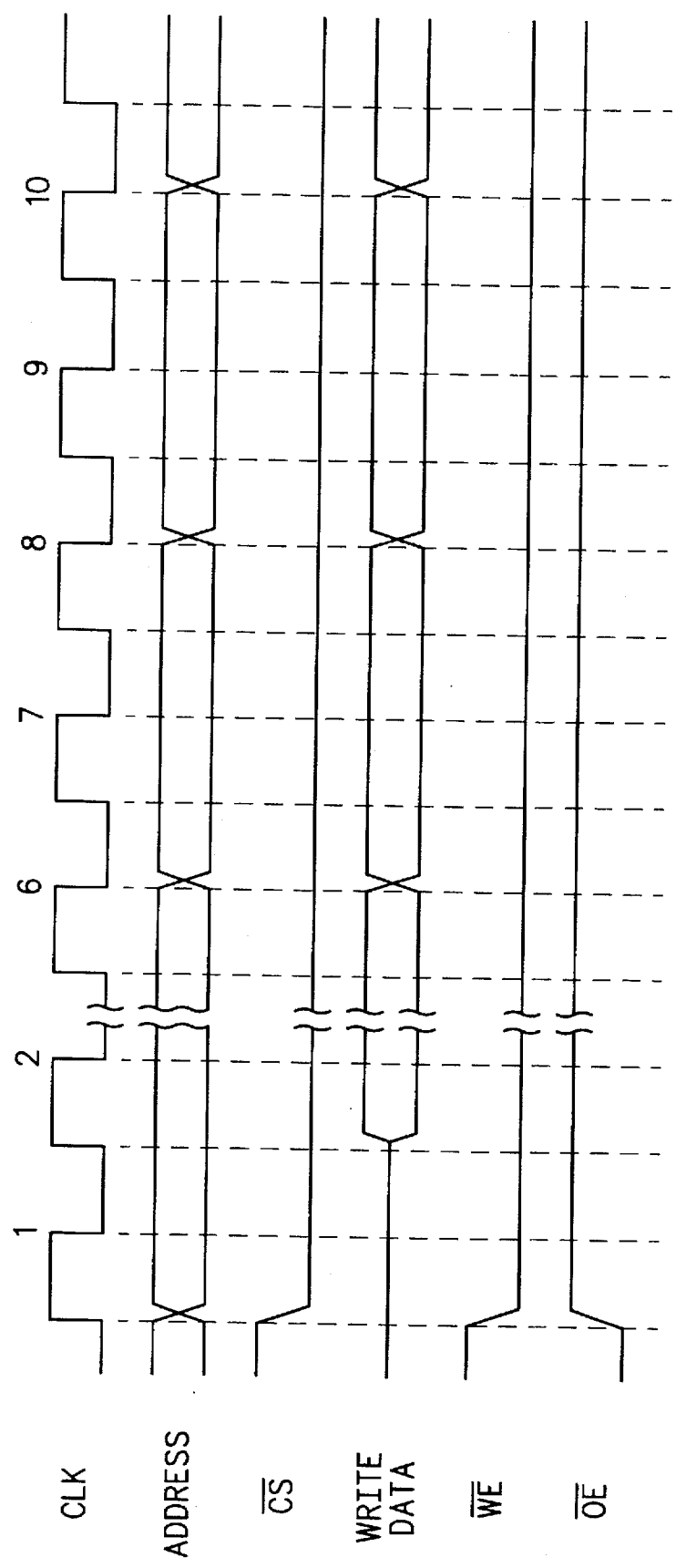
FIG. 5 illustrates in timing diagram form an example of a burst write operation executed in accordance with one embodiment of the present invention.

FIG. 5 illustrates a second example in which a burst write operation is executed in response to PA and SA values corresponding to a chip select signal asserted to access an external device. In FIG. 5, assume that an Address signal is provided to system integration unit 22 via bus 24. The Address signal is used to generate the Chip Select1 signal and the appropriate Enable Byte signals (not illustrated herein). Note that in FIG. 5, the Chip Select1 signal is represented by the $\overline{CS}$ signal. When the Chip Select1 signal is asserted, control circuitry 102 provides the Output Enable signal and the Write Enable signal to memories 56 and 58 of memory bank 55. In FIG. 5, the Output Enable signal is represented by the $\overline{OE}$ signal and the Write Enable signal is represented by the W E signal.

In FIG. 5, the PA value is equal to %101 such that nine half clock cycles must elapse before data processor 10 may write valid data to memories 56 and 58 of memory bank 55. Additionally, the SA value is equal to %100 such that only four half clock cycles must elapse before data processor 10 may write subsequent data values to memories 56 and 58 of memory bank 55. Furthermore, as this is a write operation, and not a read operation, control circuitry 102 negates the Output Enable signal provided to each of memories 56 and 58 of memory bank 55. The Output Enable signal is represented by the $\overline{OE}$ signal in FIG. 5.

Again, by allowing a user to program each of the plurality of control registers 300 and 400 to reflect optimal timing for primary and second accesses of an external memory during a burst mode of operation, the PA and SA values of the present invention efficiently perform burst memory write operations.

Operations Performed in Response to Each of the PA, SA, and WP bits

Figure 8:
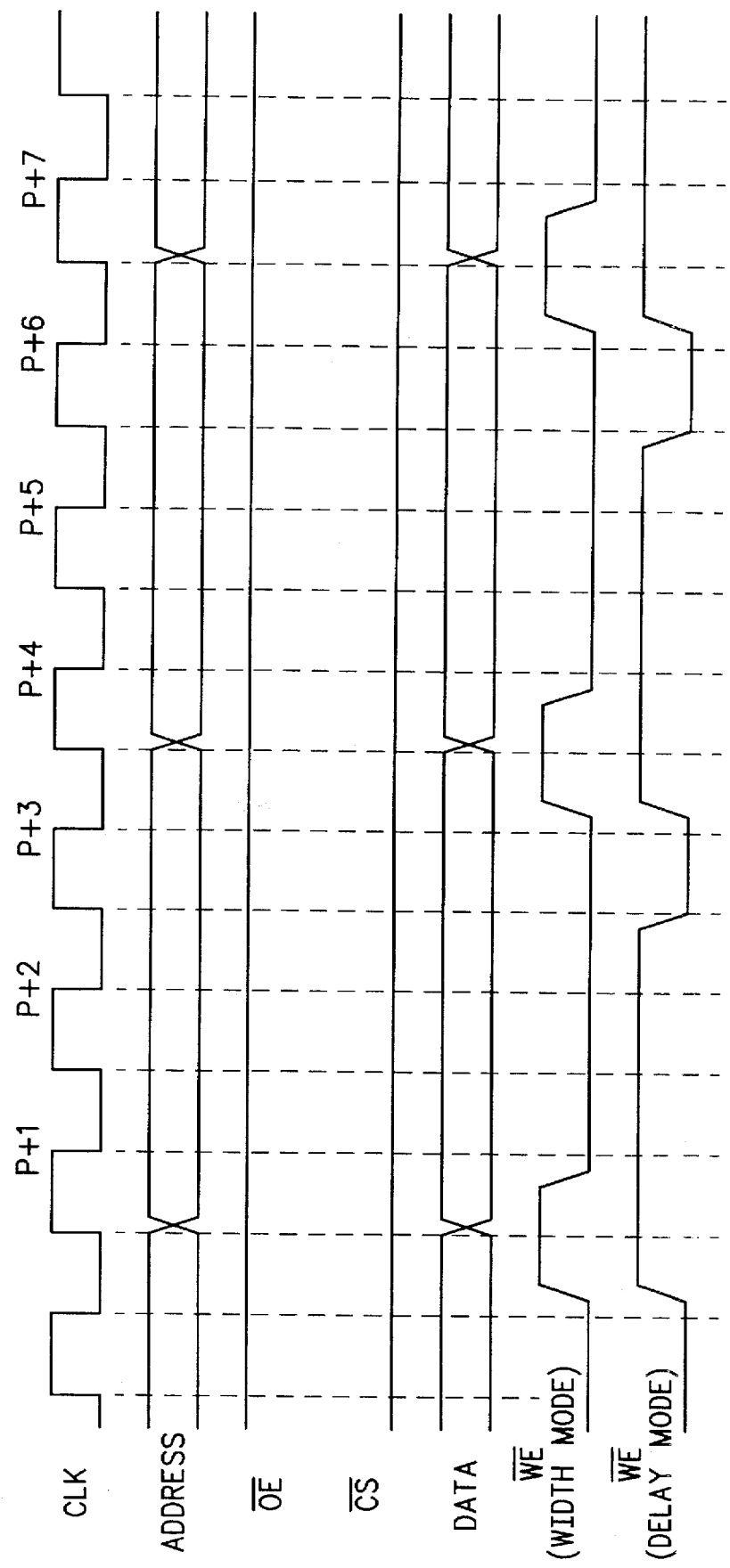
FIG. 8 illustrates in timing diagram form a write operation executed in accordance with one embodiment of the present invention.

FIG. 8 illustrates a timing example in which a burst write operation is executed with the best write burst cycle time due to write control timing effectuated by each of the PA and WP bits. As in the previous examples, assume that an Address signal is provided to system integration unit 22 via bus 24. The Address signal is used to generate the Chip Select1 signal and the appropriate Enable Byte signals (not illustrated herein). Note that in FIG. 8, the Chip Select1 signal is represented by the $\overline{CS}$ signal. When the Chip Select1 signal is asserted, control circuitry 102 provides the Output Enable signal and the Write Enable signal to memories 56 and 58 of memory bank 55. In FIG. 8, the Output Enable signal is represented by the $\overline{OE}$ signal and the Write Enable signal is represented by the $\overline{WE}$ signal.

In FIG. 8, a primary access in which a first data value is written to the address specified by the Address signal ends and each of the secondary accesses are subsequently executed from timing cycle P+1 onward. Note that in this example, the use of the WP value renders the SA value ineffectual in determining an amount of time required to perform the write burst operation because the SA value establishes a timing standard which exceeds the restrictions imposed by the WP value. For example, the SA value may specify that a secondary write operation may be performed in four half timing cycles while the WP value requires that all write operations be performed in two half timing cycles. Because the WP value imposes more restrictive timing requirements that the SA value, the SA value does not affect the timing structure of the burst write operation.

Additionally, note that as in previous examples, two modes of operation of data processor 10 are illustrated in FIG. 8. In a first mode of operation, width mode, the WP value indicates a length of time which Write Enable signal is asserted. In this case, the WP value is equal to %01 and, therefore, control circuit 102 asserts the Write Enable signal for two clock cycles (See Table 3). When the Write Enable signal is asserted for two clock cycles to one of memories 56 and 58 of memory bank 55, the device(s) enabled by the appropriate Enable Byte signal retrieve data from bus 60 and address information from bus 62 during the two clock cycles the Write Enable signal is asserted.

During operation, a user of data processing system 15 programs each of the plurality of control registers 300 and 400 in a manner which optimizes an amount of time required to write a data value to an external device. In this first example, the cycle time required to perform a write operation is equal to a number of timing cycles required to perform the primary access (as determined by the PA value) summed with a burst timing value of $[(WP+1) \times (n-1)]$, where n is equal to a number of memory locations to be written during the burst operation. Thus, in the first example illustrated in FIG. 8, the external device requires the Write Enable signal to be asserted at least two clock cycles to store a data value therein.

In the second mode of operation, delay mode, the WP value indicates a length of time which must elapse before the Write Enable signal is asserted for a fixed length of time. In this case, the WP value is equal to %00 and, therefore, control circuit 102 asserts the Write Enable signal after one clock cycle has elapsed (See Table 3). After one clock cycle, the Write Enable signal is asserted for a single clock cycle to one of memories 56 and 58 of memory bank 55, the device(s) enabled by the appropriate Enable Byte signal retrieve data from bus 60 and address information from bus 62 during the single clock cycle the Write Enable signal is asserted.

During operation, a user of data processing system 15 programs each of the plurality of control registers 300 and 400 in a manner which optimizes an amount of time required to write a data value to an external device during a write burst operation. In this second example, the cycle time required to perform a write operation is equal to a number of timing cycles required to perform the primary access (as determined by the PA value) summed with a burst timing value of $[(WP+2) \times (n-1)]$, where n is equal to a number of memory locations to be written during the burst operation. Thus, in the second example illustrated in FIG. 8, the external device requires the Write Enable signal to be delayed at least one clock cycle before assertion for enabling storage of a data value therein.

In contrast, FIG. 9 illustrates a timing example in which a burst write operation is executed with the best write burst cycle time due to write control timing effectuated by each of the PA and SA bits. As in the previous examples, assume that an Address signal is provided to system integration unit 22 via bus 24. The Address signal is used to generate the Chip Select1 signal and the appropriate Enable Byte signals (not illustrated herein). Note that in FIG. 9, the Chip Select1 signal is represented by the $\overline{CS}$ signal. When the Chip Select1 signal is asserted, control circuitry 102 provides the Output Enable signal and the Write Enable signal to memories 56 and 58 of memory bank 55. In FIG. 9, the Output Enable signal is represented by the $\overline{OE}$ signal and the Write Enable signal is represented by the $\overline{WE}$ signal.

In FIG. 9, a primary access in which a first data value is written to the address specified by the Address signal ends and each of the secondary accesses are subsequently executed from timing cycle P+1 onward.

Additionally, note that as in previous examples, two modes of operation of data processor 10 are illustrated in FIG. 9. In a first mode of operation, width mode, the WP value indicates a length of time which Write Enable signal is asserted. In this case, the WP value is equal to %01 and, therefore, control circuit 102 asserts the Write Enable signal for two clock cycles (See Table 3). When the Write Enable signal is asserted for two clock cycles to one of memories 56 and 58 of memory bank 55, the device(s) enabled by the appropriate Enable Byte signal retrieve data from bus 60 and address information from bus 62 during the two clock cycles the Write Enable signal is asserted.

During operation, a user of data processing system 15 programs each of the plurality of control registers 300 and 400 in a manner which optimizes an amount of time required to write a data value to an external device. In this first example, the cycle time required to perform a write operation is equal to a number of timing cycles required to perform the primary access (as determined by the PA value) summed with a burst timing value of [SA(n−1)], where n is equal to a number of memory locations to be written during the burst operation.

In the second mode of operation, delay mode, the WP value indicates a length of time which must elapse before the Write Enable signal is asserted for a fixed length of time. In this case, the WP value is equal to %00 and, therefore, control circuit 102 asserts the Write Enable signal after one clock cycle has elapsed (See Table 3). After one clock cycle, the Write Enable signal is asserted for a single clock cycle to one of memories 56 and 58 of memory bank 55, the device(s) enabled by the appropriate Enable Byte signal retrieve data from bus 60 and address information from bus 62 during the single clock cycle the Write Enable signal is asserted.

During operation, a user of data processing system 15 programs each of the plurality of control registers 300 and 400 in a manner which optimizes an amount of time required to write a data value to an external device during a write burst operation. As in the previous example, the cycle time required to perform a write operation is equal to a number of timing cycles required to perform the primary access (as determined by the PA value) summed with a burst timing value of [SA(n−1)], where n is equal to a number of memory locations to be written during the burst operation.

The ability to selectively program a length of time required to interface with an external device during a write operation or during a burst access operation provides a flexible solution for a data processor which must communicate with an increasing number of peripheral devices having widely varying interface requirements. The present invention allows control bits in a control register to determine the timing of Write Enable and Output Enable signals on the basis of a current access to a selected external device. Therefore, the timing of both the Write Enable and Output Enable signals may change dynamically from an access of one type of memory to another without software intervention. By providing such flexibility with little software intervention, the present invention provides a low-cost interface circuit for use with all integrated circuit microprocessors.

The implementation of the invention described herein is provided by way of example only and many other implementations may exist for executing the function described herein. For example, the PA, SA, and WP values in each of the plurality of control registers 94 may be expanded to include more bits and, therefore, provide for greater functionality.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

We claim:

1. A data processor, comprising:
   a central processing unit for communicating a plurality of address values, a plurality of data values, and a plurality of control values;
   a control circuit coupled to the central processing unit for receiving the plurality of control values, the control circuit providing a first control value; and
   a first control register coupled to the control circuit for receiving the first control value, the first control register selectively providing a first primary access value and selectively providing a first secondary access value in response to the first control value, the first primary access value indicating a first timing restriction for providing a memory enable signal which enables the data processor to perform a first memory access operation and the first secondary access value indicating a second timing restriction for providing the memory enable signal which enables the data processor to perform a second memory access operation.

2. The data processor of claim 1 wherein the first memory access operation is a primary write operation in a memory burst write operation.

3. The data processor of claim 2 wherein the second memory access operation is a secondary write operation in the memory burst write operation.

4. The data processor of claim 2 wherein the second memory access operation includes a plurality of secondary write operations for performing the memory burst write operation.

5. The data processor of claim 2 wherein memory enable signal is a write enable signal.

6. The data processor of claim 1 wherein the first memory access operation is a primary read operation in a memory burst read operation.

7. The data processor of claim 6 wherein the second memory access operation is a secondary read operation in the memory burst read operation.

8. The data processor of claim 6 wherein the second memory access operation includes a plurality of secondary read operations for performing the memory burst read operation.

9. The data processor of claim 6 wherein memory enable signal is an output enable signal.

10. The data processor of claim 1, further comprising:
    a data cache for storing a plurality of memory values.

11. The data processor of claim 10 wherein the control circuit provides the first control value and the second control vlaue when the central processing unit accesses a first data value which is not stored in the data cache.

12. The data processor of claim 11 wherein an external memory is accessed during the first memory access operation and during the second memory access operation.

13. The data processor of claim 12 wherein the first data value is read from a first address in the external memory during the first memory access operation.

14. The data processor of claim 13 wherein a second data value is read from a second address in the external memory during the second memory access operation, wherein the second address is sequential to the first address.

15. The data processor of claim 1 wherein the first control register corresponds to a first external device.

16. The data processor of claim 15 wherein the control circuit provides a second control value in response to the plurality of control values.

17. The data processor of claim 16 further comprising:
    a second control register coupled to the control circuit for receiving the second control value, the second control register selectively providing a second primary access value and selectively providing a second secondary access value in response to the second control value, the second primary access value indicating a third timing restriction for providing an enable signal which enables the data processor to perform a third memory access operation and the second secondary access value indicating a fourth timing restriction for providing the memory enable signal which enables the data processor to perform a fourth memory access operation.

18. The data processor of claim 17 wherein the second control register corresponds to a second external device.

19. A method for accessing at least one of a plurality of external devices in a data processor, comprising the steps of:
communicating a plurality of address values, a plurality of data values, and a plurality of control values with a central processing unit;
coupling a compare circuit to the central processing unit for receiving the plurality of address values;
enabling the compare circuit to provide a first compare signal indicating an address range which includes a first one of the plurality of address values;
coupling a control circuit to the central processing unit for receiving the plurality of control values;
coupling the control circuit to the compare circuit for receiving the compare signal;
enabling the control circuit to provide a first control value corresponding to a first external device in response to the first compare signal and the control circuit providing a plurality of internal control signals;
coupling a control register to the control circuit for receiving the first control value;
enabling the control register to selectively provide a first memory access value to the control circuit in response to the first control value;
enabling the control register to selectively provide a second memory access value to the control circuit in response to the first control value;
enabling the control circuit to provide an external access enable signal having a first timing restriction for providing a memory enable signal which enables the data processor to perform a first memory access operation determined by the first memory access value; and
enabling the control circuit to provide the external access enable signal having a second timing restriction for providing the memory enable signal which enables the data processor to perform a second memory access operation determined by the second memory access value.

20. The method of claim 19, further comprising the steps of:
enabling the compare circuit to provide a second compare signal indicating an address which includes a second one of the plurality of address values;
enabling the control circuit to provide a second control value corresponding to a second external device in response to receiving the second compare signal;
enabling the control register to provide the external access enable signal having a third timing restriction determined by the third memory access value;
enabling the control register to provide the external access enable signal having a fourth time restriction determined by the fourth memory access value;
coupling a plurality of control registers to the control circuit for receiving the first control value;
enabling a first one of the plurality of control registers to provide the first memory access value and the second memory access value when the first control value is provided by the control circuit; and
enabling a second one of the plurality of control registers to provide a third memory access value and a fourth memory access value when the second control value is provided by the control circuit.

21. The method of claim 19 wherein the first timing restriction is for a primary write operation in a memory burst write operation and the second timing restriction is for a secondary write operation in the memory burst write operation.

22. The method of claim 21 wherein the second memory access operation includes a plurality of secondary write operations for performing the memory burst write operation.

23. The method of claim 21 wherein external access enable signal is a write enable signal.

24. The method of claim 19 wherein the first timing restriction is for a primary read operation in a memory burst read operation and the second timing restriction is for a secondary read operation in the memory burst read operation.

25. The method of claim 24 wherein the second timing restrictions is for an operation includes a plurality of secondary read operations for performing the memory burst read operation.

26. The method of claim 24 wherein external access signal is an output enable signal.

27. The method of claim 19, further comprising the step of:
storing a plurality of memory values in a data cache.

28. The method of claim 27 further comprising the step of:
enabling the control circuit to provide the first control value and the second control value when the central processing unit accesses a first data value which is not stored in the data cache.

29. The method of claim 28 further comprising the step of:
accessing an external memory during the first memory access operation and during the second memory access operation.

30. The method of claim 29 further comprising the step of:
reading the first data value from a first address in the external memory during the first memory access operation; and
reading a second data value from a second address in the external memory during the second memory access operation, wherein the second address is sequential to the first address.

31. A method for accessing at least one of a plurality of external devices in a data processor according to claim 19, further comprising the steps of:
enabling the control circuit to provide an external access enable signal having a first timing restriction determined by the first memory access value and having a second timing restriction determined by the second memory access value during the same memory access cycle.

32. A data processor according to claim 1, wherein the first primary access value and the first secondary access value are provided by the first control register to indicate the first timing restriction and second timing restriction, wherein the first memory access and second memory access are consecutively executed.

* * * * *